T. DOUGLAS.
AUTOMATIC ENGINE SPEED GOVERNOR FOR VEHICLES.
APPLICATION FILED JAN. 17, 1914.
1,128,115.
Patented Feb. 9, 1915.
4 SHEETS—SHEET 1.
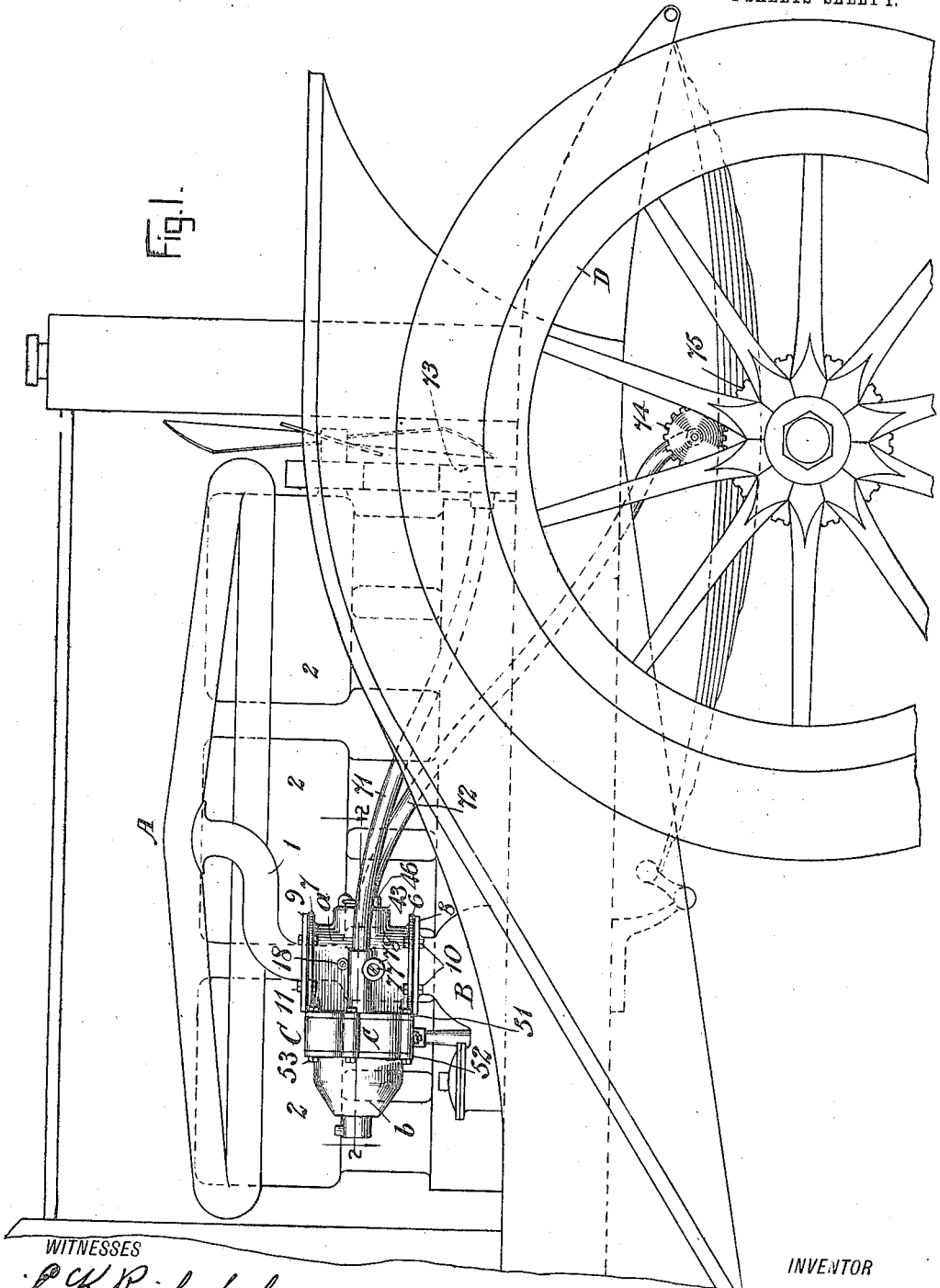
WITNESSES
INVENTOR
Theodore Douglas
BY
Munn & Co.
ATTORNEYS

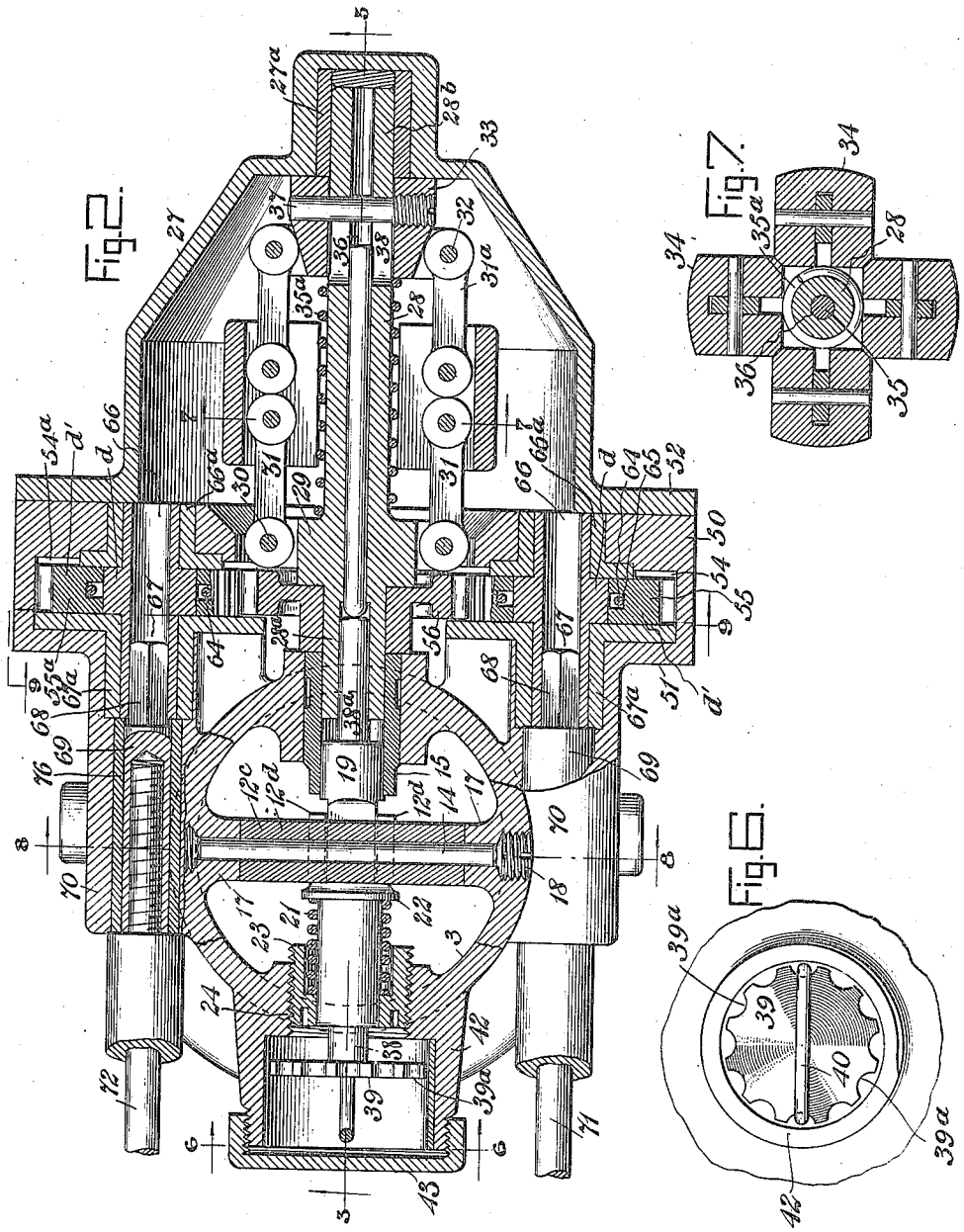

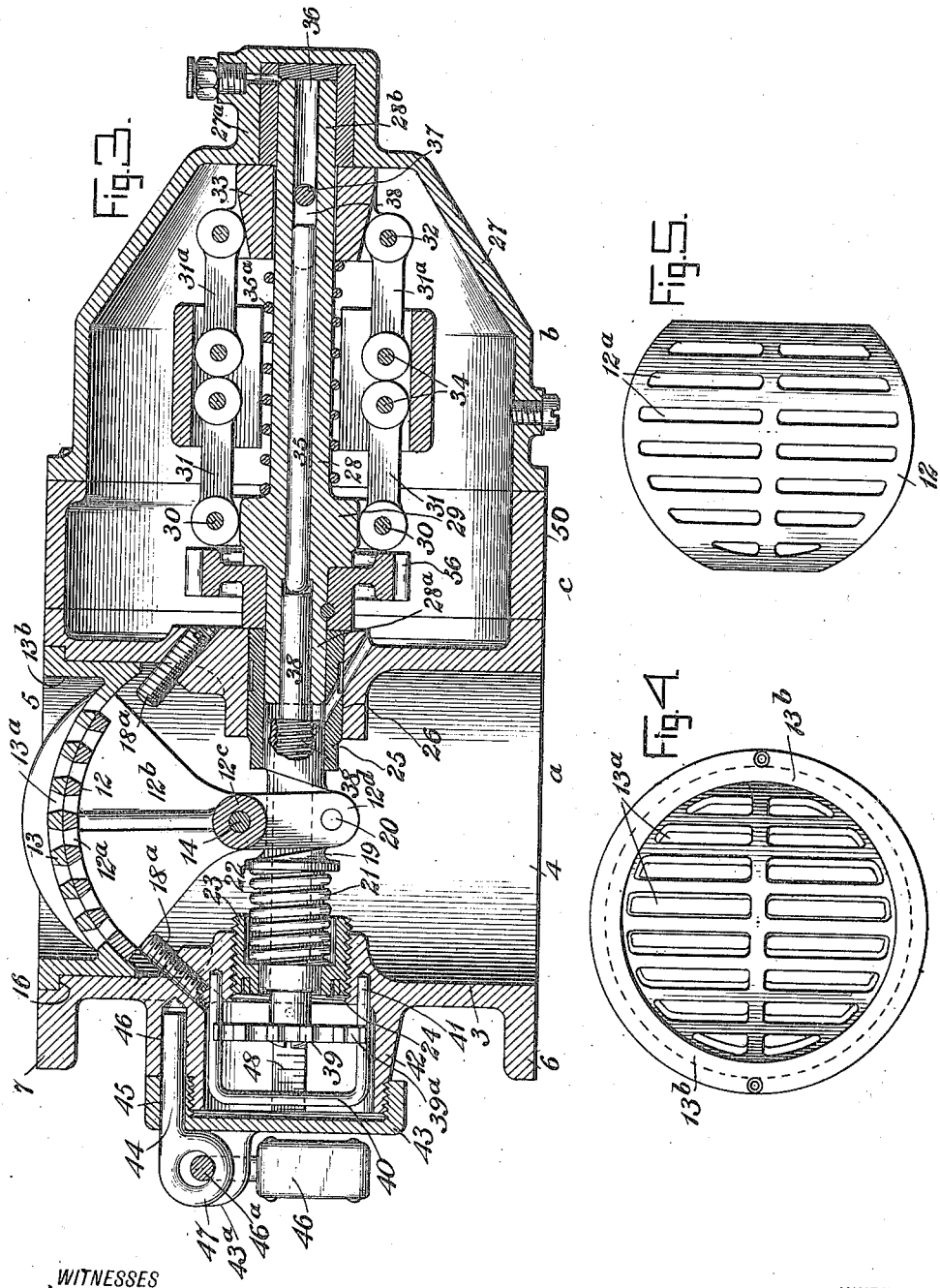

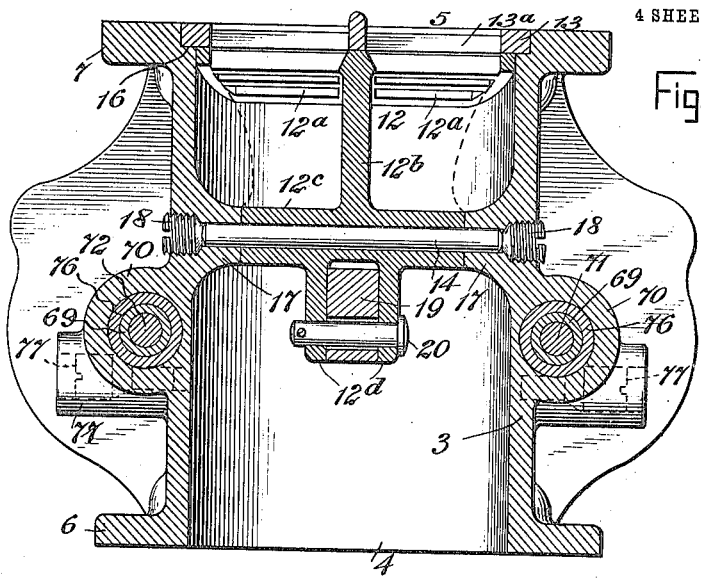

UNITED STATES PATENT OFFICE.

THEODORE DOUGLAS, OF SCARBORO, NEW YORK.

AUTOMATIC ENGINE-SPEED GOVERNOR FOR VEHICLES.

1,128,115. Specification of Letters Patent. Patented Feb. 9, 1915.

Application filed January 17, 1914. Serial No. 812,789.

*To all whom it may concern:*

Be it known that I, THEODORE DOUGLAS, a citizen of the United States, and a resident of Scarboro, in the county of Westchester and State of New York, have invented a new and Improved Automatic Engine-Speed Governor for Vehicles, of which the following is a full, clear, and exact description.

This invention relates to engine governors of the automatic type and adpated to be used between the throttle and inlet or inlets of an engine and operatively connected with the speed shaft of the engine or some moving part of the machine driven thereby, or with both, whereby the speed of the engine or of the machine driven will, when excessive speed is attained, cut down the supply of elastic or explosive fluid to the engine for controlling the speed thereof.

The general objects of the present invention are to improve and simplify the construction and design of the various instrumentalities that go to make up the apparatus such as the speed responsive device, the valve controlled thereby and the gearing mechanism between the governor shaft and the engine or vehicle, whereby a durable, substantial and compact structure is produced in which the parts can be readily assembled and disassembled and by which a successful and efficient operation is secured.

A specific object of the invention is to provide novel means for mounting, adjusting and operating the valve which controls the supply of elastic or explosive fluid to the engine to prevent the abnormal increase in speed thereof under a light load on the engine or when the vehicle is traveling at an abnormally high rate of speed.

A further specific object of the invention is to provide a novel arrangement of gears, clutches and connections between the governor shaft and the differentially driven shafts connected with the engine and with some moving part of the vehicle respectively.

With such objects in view, and others which will appear as the description proceeds, the invention comprises various novel features of construction and arrangement of parts such as will be set forth with particularity in the following description and claims appended hereto.

In the accompanying drawings, which illustrate one embodiment of the invention, and wherein similar characters of reference indicate corresponding parts in all the views, Figure 1 is a side view of the front portion of a vehicle driven by an explosive engine, the side of the bonnet or hood being removed to show the position of the automatic engine governing valve in its relation to the engine and carbureter; Fig. 2 is an enlarged sectional view of the automatic fluid-controlling governor taken on the line 2—2, Fig. 1; Fig. 3 is a longitudinal section on the line 3—3 of Fig. 2; Fig. 4 is a plan view of the valve seat or stationary grid; Fig. 5 is a plan view of the valve or movable grid; Fig. 6 is a sectional view on the line 6—6, Fig. 2, showing the valve adjusting or setting device; Fig. 7 is a transverse section of the governor on the line 7—7, Fig. 2; Fig. 8 is a transverse section of the valve chamber and valve taken on the line 8—8, Fig. 2; and Fig. 9 is a transverse section on the line 9—9, Fig. 2, to show the gearing and clutches for the governor shaft.

Referring to Fig. 1 of the drawing, it will be observed that the invention is shown in use in connection with an explosive engine A installed on a vehicle for propelling the same, but it is to be understood that the invention can be employed in connection with elastic fluid motors and for driving any variable speed machinery. The engine A is provided with an inlet pipe or manifold 1 which supplies the fuel mixture to the various cylinders 2; and between this manifold 1 and carbureter B is the automatic fuel controlling device C which constitutes the subject matter of the present invention. This device C is brought into play only when the speed of the engine or of the vehicle exceeds a predetermined point, and it will be understood that the speed of the vehicle will be controlled in the usual manner, as by a throttle, not shown, which forms a part of the carbureter. The automatic governing device C is of compact construction so as to occupy comparatively little space between the carbureter and engine and at the same time be positioned under the hood of the car.

The automatic governing device C is made according to the present instance in three sections, namely, the valve section $a$, the governor section $b$, and the transmission section $c$, which sections are removably fastened together to form a unitary structure which is fastened to the carbureter and manifold without the necessity of any special supporting means. The section *a* comprises a casing 3 of approximately cylindrical form and open at the bottom 4 and at the top 5 as clearly shown in Figs. 3 and 3, and at these open portions are flanges 6 and 7 which coact with flanges 8 and 9 on the carbureter and manifold, and by means of bolts 10 and 11 fastened to the flanges the automatic governing device is fastened in position. The mixture passes from the carbureter upwardly through the valve section *a* of the apparatus and thence to the manifold, the flow of the fluid being controlled by an oscillatory valve 12 which coacts with a valve seat 13 set into the upper end of the valve casing 3. The valve 12 is a grid which is arcuate with respect to the axis 14 on which it swings, as shown in Fig. 3, and which in plan view is approximately circular, as shown in Fig. 5, and in the body of the valve are ports 12$^a$ through which the explosive mixture flows. The seat 13 is also a grid of approximately the same form as the valve and has ports 13$^a$ that are adapted to register with the ports of the valve when the latter is in full open position, and around the grid that forms the valve seat 13 is a cylindrical shouldered flange 13$^b$, the shoulder of which is adapted to rest on an annular shoulder 16 in the upper end of the valve casing 3, the arrangement being such that when the manifold is bolted to the governing device the valve seat will be held in place. The grid of the valve 12 is formed with a triangular web 12$^b$ which is formed with a hub 12$^c$ through which extends a pivot pin that has its ends disposed in bearings 17 formed in the sides of the valve casing 3, as shown in Figs. 2 and 8, there being screws 18 threaded in the bearings 17 from outside the casing, so as to removably hold the pivot pin or axle 14 in place. Within the casing 3 and at opposite sides of the valve are adjustable stops 18$^a$ formed by screws and so arranged as to engage the web 12$^b$ of the valve and thereby limit the opening and closing movement of the latter, the valve being fully opened when the ports thereof register with the ports of the seat, as shown in Fig. 3. Extending from the hub 12$^c$ in a direction opposite from the grid portion of the valve 12 are spaced lugs 12$^d$ which straddle a reciprocatory spindle 19 and to which the said lugs are hingedly connected by a pivot pin 20 which is parallel with the axle 14 of the valve, whereby longitudinal movement of the spindle 19 causes oscillatory movement of the valve to vary the volume of explosive mixture that passes to the engine. This spindle is idle during normal speed conditions, but when the speed of the engine or vehicle exceeds a predetermined point the speed responsive means of the apparatus is brought into play to shift the valve for effecting a decrease in the effective opening thereof. The movement of the valve under normal conditions is prevented by means of it being subjected to the pressure of a spring 21 which is of the helical type and encircles the spindle or element 19 and has one end bearing on a shoulder 22 on the spindle and the other end bearing on a cupped ring 23 which screws into an opening 24 in the wall of the valve casing 3, such ring 23 also forming a guide or bearing for the outer end of the spindle, the inner end thereof being slidable in a sleeve or tubular bearing 25 mounted in an opening 26 in the wall of the valve casing at a point diametrically opposite from the opening 24.

The governor section *b* of the apparatus comprises a casing 27 that contains the speed responsive device which operates the valve 12. This speed responsive device comprises a hollow shaft 28 that is formed with a head 29 at one end to which are hingedly connected at 30 four links 31 extending parallel with and spaced ninety degrees apart around the shaft 28, and another set of links 31$^a$ symmetrically disposed are hingedly connected at 32 with a sliding collar 33 on the outer end of the governor shaft. Each link 31 and its companion link 31$^a$ are hingedly connected to a centrifugally acting weight 34, which weights are normally held indrawn by the tension of a helical spring 35$^a$ surrounding the governor shaft 28 and interposed between and engaging the head 29 and collar 33. The inner end 28$^a$ of the governor shaft 28 is rotatable in the bearing bushing 25, there being sufficient clearance between the said inner end and the inner end of the spindle 19 to permit the latter to slide back and forth; and the outer end 28$^b$ of the governor of the shaft is rotatable in a bearing 27$^a$ of the governor casing 27. The speed responsive device communicates motion to the valve actuating spindle 19 through a pin 35 which is slidable in the bore 36 of the governor shaft, and this pin receives motion from the collar 33, which has a transverse pin 37 which passes through slots 38 in the governor shaft. The sliding pin 35 does not normally engage the pin or part 37 carried by the governor collar 33, so that the weights of the governor or speed responsive device can move outwardly under centrifugal speed below a certain number of revolutions per minute, and when this speed is exceeded the sliding pin 35 will receive motion from the speed responsive device, and this motion is imparted to the fuel controlling valves 12. An adjustable means is provided between the sliding pin 35 and the valve actuating element or spindle 19, such adjustable means being in the form of a screw 38 which extends entirely through and is threaded in the spindle 19, with the inner end 38ª of the screw being smooth and entered in the governor shaft so as to engage the inner end of the sliding pin 35. The outer end of the screw 38 is provided with a wheel 39 whereby the screw can be conveniently turned. It will be understood that by turning the screw the lost motion between the sliding pin 35 and the governor collar 33 can be regulated so that the speed at which the governor or speed responsive device begins to close the valve can be varied. After the governor collar 33 has engaged the sliding pin 35, the weights of the governor are thereafter opposed by the spring 21, in addition to the spring 35ª, and as the spring 21 is also adjustable the speed responsive device can be accurately loaded.

It is desirable to lock the adjusting screw 38 after it is once adjusted, and for this purpose a staple-like lock 40 straddles the handwheel 39 of the screw and engages in peripheral notches 39ª on the wheel, and the ends of the lock enter sockets 41 in the wall of the valve casing 3. The valve casing is provided with a hollow boss 42 that extends outwardly from the opening 23 and forms a chamber for the wheel 39 and its lock 40, such chamber being closed by a removable cap 43 which screws on the boss 42. A bolt or key 44 enters openings 45 and 46 in the cap and boss, respectively, as shown in Fig. 3, so as to prevent unscrewing of the cap, and this bolt is prevented from being taken out except by an authorized person, since a padlock 46 is applied to this key 44, which key has an eye 47 through which and also through a lug 43ª the yoke 46ª of the lock extends. To facilitate the adjustment of the screw the scale or other indicator 48 is fastened in the boss 42, and by relation of the wheel 38 with such indicator the position of the adjusting screw 38 and hence of the sliding pin 35 can be determined.

The intermediate or gear-containing section c of the apparatus comprises a flat frame 50 which is shaped as shown in Fig. 9 and fits between the valve casing 3 and governor casing 27, said casings being respectively provided with flanges 51 and 52 to receive the bolts 53, Figs. 1 and 9, that fasten the three sections of the apparatus together. The frame 50 is formed with chambers 54 and 54ª in which are disposed gears 55 and 55ª, respectively, and both of these gears mesh with an intermediate gear 56 which is mounted on the governor shaft 28 and secured thereto by a pin 57ª. As shown in Fig. 9, the gears 55 and 55ª each have a hub section d on which the toothed section d' is free to rotate if the section d' travels faster than the hub section, but clutching means are provided between the two sections for both to rotate as a unit under certain conditions. The hub opening 57 of each section d' has shoulders or abutments 58 with which is adapted to engage the pawl 59 pivoted at 60 in a recess 61 in the hub section d, and from this pawl projects a lug 62 that is disposed between two spaced stops or abutments 63 and 63ª carried by the outer section d'. These stops are formed by a circular wire or equivalent means 64 which is set into a groove 65 formed in the opening 57 of the outer section d' of each driving gear 55 and 55ª. It is to be understood that the gears 55 and 55ª usually rotate at a different speed and one will act as a driver for the gear 56, while the other is idle. In Fig. 9 the gear 55ª is shown in the operation of driving, as its pawl 55 is clutching the two sections d and d' together, while the clutch pawl of the gear 55 is in inoperative position. The gear 55ª rotates in a clockwise direction and drives the gear on the governor shaft in an anticlockwise direction, while this latter gear in turn idly drives the gear 55 in a clockwise direction. If, however, the relative speeds of the hub sections of the gears 55 and 55ª should change and the hub of the gear 55 rotate at the higher speed, the clutch pawl thereof would immediately be thrown into play and the gear 55 then become the driver for the gear 56. The hub members d of the gear wheels are provided with journals 66 and 67, as shown in Fig. 2, which rotate respectively in bushings 66ª and 67ª disposed in the frame 50 and valve casing 3. The journals 67 are hollow and shaped to receive the squared portions 68 of couplers 69, which couplers are journaled in bearings 70 formed on opposite sides of the valve casing, as shown in Fig. 2. The coupler for the gear 55 is connected with a flexible or other shaft 71, while the coupler for the gear 55ª is connected with a flexible shaft or other connection 72, such shafts being, as shown in Fig. 1, operatively connected with the engine A and with some moving part of the vehicle, such as the wheel D. In Fig. 1 the shaft 71 is shown connected by a gear 73 with the crank shaft of the engine, while the shaft 72 is shown provided with a pinion 74 that meshes with a gear 75 on the hub of the wheel D. By this arrangement it is evident that the governor will respond to the speed of the engine and to the speed of the vehicle. If, when the load of the engine is thrown off, the speed of its crank shaft tends to rise above an abnormal point, the valve 12 will cut down the supply of fuel mixture to the engine and thereby slacken the speed of the latter; and also, should the vehicle travel at too high a speed, as in coasting, and with the clutch of the vehicle open, the valve 12 will be closed so as to cut down and economize the fuel consumption. The couplers 69 rotate in bushings 76 which are held in place by binding screws 77 threaded in bosses 78 provided on the side of the valve casing 3 just under the bearings 70.

From the foregoing description taken in connection with the accompanying drawings, the advantages of the construction and method of operation will be readily understood by those skilled in the art to which the invention appertains, and while I have described the apparatus which I now consider to be the best embodiment thereof, I desire to have it understood that the apparatus shown is merely illustrative, and that such changes may be made when desired as are within the scope of the appended claims.

Having thus described my invention, I claim as new and desire to secure by Letters Patent:

1. An automatic speed governor comprising a valve, a spindle hingedly connected with the valve, a spring acting on the spindle for holding the valve in open position, centrifugally-acting weights, a spring opposing the outward movement of the weights, and means through which the weight acts on the spindle in opposition to the first-mentioned spring for moving the valve closed, the axis about which the weights rotate being coincident with the axis of the spindle, and the valve being located at one side of the spindle.

2. An automatic speed governor comprising a valve casing, a valve therein, a spindle extending across the casing and mounted for reciprocation, a spring operating on the spindle for moving the valve to open position, a tubular shaft in alinement with the spindle, a speed responsive device connected with the shaft, means for rotating the shaft, a sliding element in the shaft and arranged to be operated by the speed responsive device, and adjustable means extending through the spindle and connected therewith to receive motion from the said sliding element.

3. A speed governor comprising a valve, a hollow spindle operatively connected with the valve for moving the same, a spring arranged to hold the valve in one position, a member threaded in the spindle, and a speed responsive device operatively related with the said member to move the valve in opposition to the said spring.

4. An automatic speed governor comprising an oscillatory valve, a spindle mounted for reciprocation, a speed responsive device, a member actuated thereby, a screw carried by and extending through the spindle and adjustable with respect to said member, said member and screw being in end to end contact and a locking device for preventing turning of the screw and permitting reciprocation thereof with the spindle.

5. An automatic speed governor comprising an oscillatory valve, a hollow internally threaded spindle mounted for reciprocation, a pivot for the valve located at one side of the spindle, a hinge connection between the opposite side of the spindle and valve, a speed responsive device, a member actuated thereby, a screw carried by the spindle and adjustable with respect to said member, a wheel on the screw for turning the same, and a device removably engaged with the said wheel for preventing turning thereof while permitting the screw to reciprocate with the spindle.

6. An automatic speed governor comprising a valve casing, a valve therein, a spindle extending across the casing and operatively connected with the valve, bearings in opposite walls of the casing in which the spindle reciprocates, a speed responsive device, a screw extending through the spindle and threaded therein for adjustment to the speed responsive device, a chamber in the side of the casing and having a removable part, operating means for the screw arranged in the said chamber, and means for locking the removable part of the chamber in place.

7. An automatic speed governor comprising a valve casing, a valve therein, a spindle extending across the casing and operatively connected with the valve, bearings in opposite walls of the casing in which the spindle reciprocates, a speed responsive device, a screw extending through the spindle and threaded therein for adjustment to the speed responsive device, a chamber in the side of the casing and having a removable part, a wheel on the screw for turning the same and having notches, a device removably positioned in the chamber and engaging a notch of the wheel for preventing turning thereof while permitting the screw to reciprocate with the spindle, and means for locking the removable part of the chamber in place.

8. An automatic speed governor comprising a casing, a valve therein, a tubular spindle hingedly connected with the valve for moving the same, bearings in opposite sides of the casing for supporting the spindle, one of the bearings being adjustable, an abutment on the spindle, a spring interposed between the abutment and adjustable bearing whereby adjusting the bearing varies the tension of the spring, a screw extending through the spindle and having its ends extending out of the casing, a speed responsive device, an element between the device and screw for imparting movement to the latter and spindle, and a handwheel fastened to the screw for adjusting the same with respect to the element.

9. An automatic speed governor comprising a casing, a valve therein, a speed responsive device operatively related to the valve, differently-driven elements mounted on the casing, and a gear connecting each element with the speed responsive device and including a clutch, the gears being located between the speed responsive device and the valve.

10. An automatic speed governor comprising a casing, a valve therein, a spindle connected with the valve, a speed responsive device including a movable element, a member between the element and spindle for moving the latter, a gear mechanism mounted between the speed responsive device and casing of the valve and operatively connected with the speed responsive device for rotating the same, and differently driven elements mounted on the casing at opposite sides, and clutches between the differently driven elements and gear mechanism.

11. An automatic speed governor comprising a valve, a reciprocatory spindle connected with the valve for moving the same, a screw extending through the spindle, a governor shaft alining with the spindle, a gear on the end of the governor shaft nearest the spindle, a driving gear meshing with the said gear, centrifugally-acting elements connected with the said shaft, a sliding pin carried by the shaft and arranged to engage the screw and move the spindle, means for opposing the movement of the said elements, and a spring tending to hold the valve open and combining with the said means to oppose the closing movement of the valve by the centrifugally acting elements.

12. An automatic speed governor comprising a casing, oppositely-disposed bearings therein, an axle supported by the bearings, an oscillatory valve mounted on the axle, a seat coöperating with the valve, a reciprocatory spindle extending transversely to the axle at the side thereof opposite from the said seat, a pivotal connection between the valve and spindle, a speed responsive device including a sliding element in alinement with the spindle, a member extending axially of the spindle and adjustable therein to engage with the said sliding element, and means tending to hold the valve in open position.

In testimony whereof I have signed my name to this specification in the presence of two subscribing witnesses.

THEODORE DOUGLAS.

Witnesses:
JAMES J. PHELAN,
J. F. COOPER.